United States Patent
Forster

(10) Patent No.: US 9,299,021 B2
(45) Date of Patent: Mar. 29, 2016

(54) RFID DEVICES AND METHODS FOR MANUFACTURING

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 12/944,036

(22) Filed: Nov. 11, 2010

(65) Prior Publication Data

US 2012/0118975 A1     May 17, 2012

(51) Int. Cl.
| | |
|---|---|
| *G06K 19/077* | (2006.01) |
| *H01Q 9/26* | (2006.01) |
| *H01Q 9/27* | (2006.01) |
| *H01Q 9/28* | (2006.01) |
| *H01Q 1/22* | (2006.01) |

(52) U.S. Cl.
CPC .... *G06K 19/07771* (2013.01); *G06K 19/07749* (2013.01); *G06K 19/07773* (2013.01); *G06K 19/07777* (2013.01); *G06K 19/07788* (2013.01); *H01Q 1/2225* (2013.01); *H01Q 9/26* (2013.01); *H01Q 9/285* (2013.01)

(58) Field of Classification Search
CPC ............... G06K 19/07749; G06K 19/07756; G06K 19/07771; G06K 19/07773; G06K 19/07777; G06K 19/07779; G06K 19/07786; G06K 19/07788; H01Q 1/36; H01Q 1/38; H01Q 1/40; H01Q 13/16; H01Q 9/42; H01Q 1/22; H01Q 1/2208; H01Q 1/2225; H01Q 7/00; H01Q 9/16; H01Q 9/065; H01Q 9/24; H01Q 9/26; H01Q 9/28; H01Q 9/285; H01Q 5/0086
USPC ......... 235/492, 488; 340/572.1, 572.5, 572.7; 343/700 MS, 852, 767, 770
See application file for complete search history.

(56) References Cited

U.S. PATENT DOCUMENTS

| | | | | |
|---|---|---|---|---|
| 7,064,668 | B2 * | 6/2006 | Porad ..................... | 340/572.1 |
| 7,120,987 | B2 * | 10/2006 | Liu et al. ................ | 29/600 |
| 7,336,243 | B2 * | 2/2008 | Jo et al. ................... | 343/895 |
| 7,339,550 | B2 * | 3/2008 | Hayama et al. ......... | 343/895 |
| 7,701,350 | B2 * | 4/2010 | Sakama et al. .......... | 340/572.7 |
| 7,812,729 | B2 * | 10/2010 | Copeland ................. | 340/572.7 |

(Continued)

FOREIGN PATENT DOCUMENTS

| | | |
|---|---|---|
| EP | 1988491 | 11/2008 |
| WO | 2009073742 | 6/2009 |

OTHER PUBLICATIONS

International Search Report dated May 23, 2012 for International Application No. PCT/US2011/060330 filed Nov. 11, 2011.

(Continued)

*Primary Examiner* — Michael G Lee
*Assistant Examiner* — Suezu Ellis
(74) *Attorney, Agent, or Firm* — Avery Dennison Retail Information Services LLC

(57) ABSTRACT

A RFID device includes a substrate, a conductive element, and a RFID chip. The conductive element is coupled to the substrate and defines at least one pathway. The RFID chip includes an integrated circuit, a terminal, and an electrical lead connecting the integrated circuit and the terminal. The terminal is in electrical communication with the conductive element. The RFID chip is positioned so that a first portion of the RFID chip is positioned above the conductive element and a second portion of the RFID chip is positioned above the at least one pathway. Methods are also provided.

9 Claims, 7 Drawing Sheets

(56) References Cited

U.S. PATENT DOCUMENTS

| | | | |
|---|---|---|---|
| 7,884,726 B2* | 2/2011 | Cote et al. | 340/572.7 |
| 7,963,451 B2* | 6/2011 | Kawai | 235/492 |
| 2005/0024287 A1 | 2/2005 | Young-Min et al. | |
| 2005/0093678 A1 | 5/2005 | Forster et al. | |
| 2005/0134460 A1* | 6/2005 | Usami | 340/572.7 |
| 2005/0248488 A1* | 11/2005 | Modro | 343/700 MS |
| 2006/0054710 A1 | 3/2006 | Forster et al. | |
| 2007/0130754 A1 | 6/2007 | Fein | |
| 2007/0139205 A1* | 6/2007 | Tanaka et al. | 340/572.8 |
| 2007/0200708 A1* | 8/2007 | Hayama et al. | 340/572.7 |
| 2007/0200782 A1 | 8/2007 | Hayama et al. | |
| 2007/0214055 A1* | 9/2007 | Temko | 705/22 |
| 2008/0122631 A1* | 5/2008 | Kodukula et al. | 340/572.8 |
| 2008/0143535 A1* | 6/2008 | Fischer | 340/572.7 |
| 2008/0150719 A1* | 6/2008 | Cote et al. | 340/572.1 |
| 2008/0211637 A1* | 9/2008 | Smith | 340/10.42 |
| 2009/0201156 A1* | 8/2009 | Kato | 340/572.5 |
| 2009/0278687 A1* | 11/2009 | Kato | 340/572.1 |
| 2009/0321527 A1* | 12/2009 | Kato et al. | 235/486 |
| 2010/0126000 A1 | 5/2010 | Forster | |

OTHER PUBLICATIONS

Written Opinion dated May 23, 2012 for International Application No. PCT/US2011/060330 filed Nov. 11, 2011.
Partial European Search Report dated Mar. 17, 2014 for Application No. EP 13005791.
The State Intellectual Property Office of P.R.C. First Office Action and Search Report dated Jun. 12, 2014.

* cited by examiner

RFID DEVICES AND METHODS FOR MANUFACTURING

TECHNICAL FIELD OF THE INVENTION

This disclosure relates generally to Radio Frequency Identification (RFID) devices and more particularly to RFID devices configured to operate effectively when positioned near conductive and dielectric components.

BACKGROUND OF THE INVENTION

RFID devices can be arranged to store information and data. RFID devices are often attached or associated with individual items such as consumer goods or industrial goods and arranged to store information and data regarding such goods. A RFID reader can be used to interrogate RFID devices to retrieve such stored information and data. RFID readers interrogate RFID devices by broadcasting a radio signal to the RFID device. When the RFID device receives the broadcast signal, the RFID device reflects a responsive radio signal to the RFID reader that includes information and data stored on the RFID device.

The nature of the radio signal received and reflected by the RFID device can include electric fields, magnetic fields, combinations of both and electromagnetic waves. The manner in which a RFID device handles such radio signals can be affected by the environment in which the RFID device operates. For example, conductive and dielectric components that are positioned proximate to a RFID device can affect how a RFID device handles radio signals. Combinations of conductive and dielectric components positioned proximate to the RFID device can cause a RFID device to operate inefficiently or inaccurately.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, a RFID device includes an inlay having a substrate, a conductive element, and a RFID chip. The conductive element is coupled to the substrate and defines at least one pathway. The RFID chip includes an integrated circuit, a terminal, and an electrical lead connecting the integrated circuit and the terminal. The terminal is in electrical communication with the conductive element. The RFID device is positioned so that a first portion of the RFID device is positioned above the conductive element and a second portion of the RFID device is positioned above the at least one pathway.

In accordance with another embodiment, a method is provided for maintaining a stable operating frequency for a RFID device. The method comprises positioning a layer of conductive material onto a non-conductive substrate. The method further comprises removing at least a portion of the layer of conductive material to define at least one pathway in the layer of conductive material that exposes a portion of the substrate. The configuration of the pathway is determined by the environment in which the RFID device is intended to be used. The method further comprises positioning a RFID chip so that a first portion of the RFID chip is positioned over the layer of conductive material and a second portion of the RFID chip is positioned over the at least one pathway. The method further comprises placing an integrated circuit positioned on the RFID chip in electrical communication with the layer of conductive material.

In connection with a further exemplary embodiment of the presently described invention, a method for making a RFID device for use with a consumer product is provided and includes the steps of initially providing a consumer product, the consumer product has a body portion and a lid portion with at least one of the body and lid portion being composed of a metal foil. Next, an environment produced by the consumer product is evaluated for a RFID device. A conductive element is provided and a design is determined for the conductive element. Then at least one pathway is cut into the conductive element based on the design to form a prototype RFID device. The prototype RFID device is modeled and tested once the prototype RFID device is placed in proximity with the environment created by the consumer product. The finished design is modified based on the testing for the RFID device and if the design passes the testing and modeling the finished design is produced.

The foregoing method may also include the additional steps of attaching the finished design to the consumer product or temporarily attaching the finished design to the consumer product and then retesting to make sure the RFID device operates satisfactorily in the environment. The finished design may be further modified or altered if necessary.

In a still further exemplary embodiment, a RFID device for use with a consumer product is presented and includes a container that has a body and a lid, with one of the body and lid constructed from a metal foil. The lid has a diameter which is secured to the body portion. A RFID inlay is secured to a portion of the diameter. The RFID inlay has a conductive substrate with at least one pathway cut into the substrate and the RFID inlay in operative association with the lid.

In the foregoing embodiment the inlay may include a strap which is secured to a portion of the diameter and may be in a planar or non-planar arrangement.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of RFID devices and methods for arranging or configuring RFID devices are hereinafter disclosed and described in detail with reference made to FIGS. 1-6.

Figure 1:
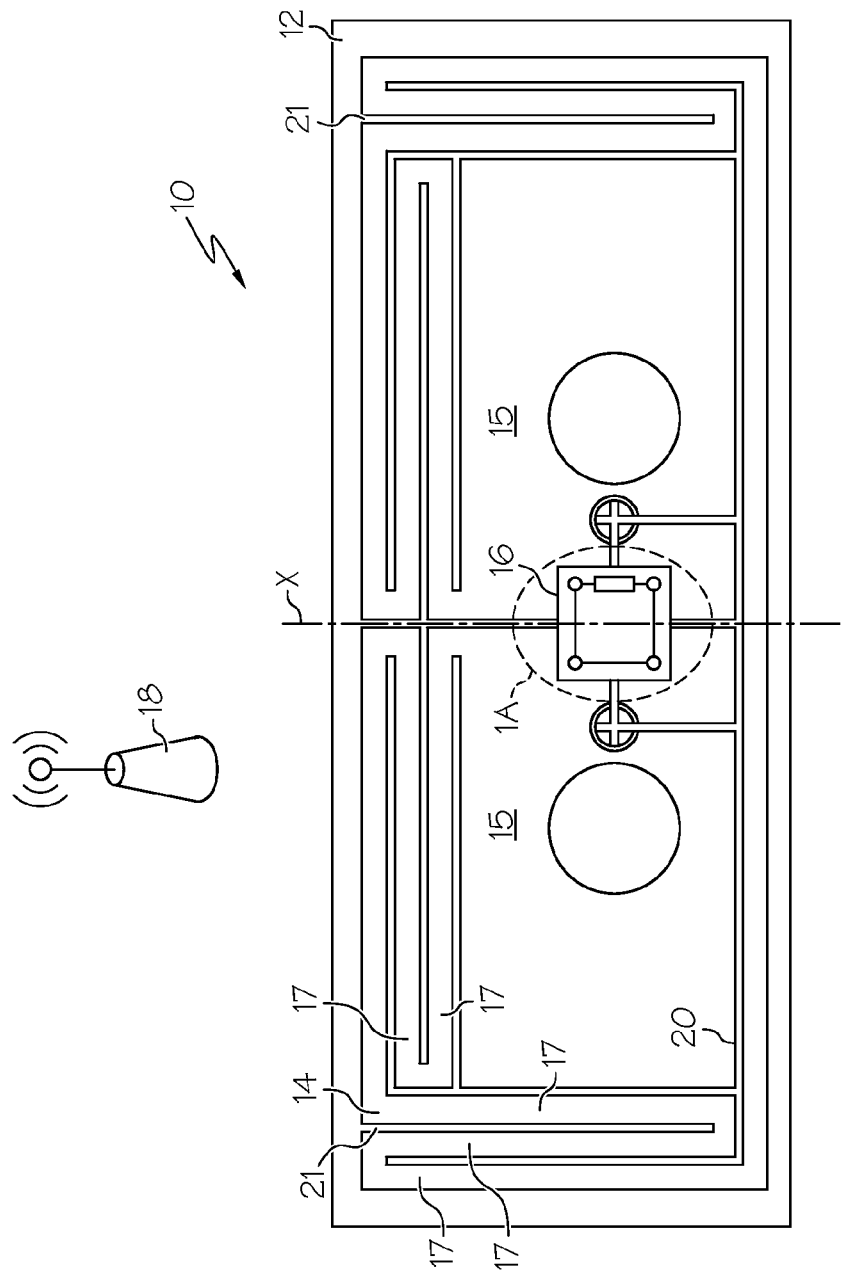
FIG. 1 is a schematic view depicting a RFID device in accordance with one embodiment and in association with a RFID reader.

An example of a RFID device 10 is schematically illustrated in FIG. 1. The RFID device 10, such as an inlay, available from Avery Dennison RFID Company of Clinton, S.C. can include a substrate 12, a conductive element 14, and a RFID chip 16 connected to the conductive element. The substrate 12 can operate as a structural component that provides mechanical strength and structure to the RFID device 10. The substrate 12 can be fabricated from a non-conductive material such as polyethylene terephthalate (PET), polyvinyl chloride (PVC), polystyrene, polyethylene, nylons, or other suitable materials. In one example, the substrate 12 is a PET layer that is approximately 250 micrometers thick. In another example, the substrate 12 is approximately 125 micrometers thick.

The conductive element 14 can be fabricated from a conductive material such as copper, aluminum, or other suitable material. The conductive element 14 can be configured to operate as an antenna for the RFID device 10. When configured as an antenna, the conductive element 14 can receive and propagate radio signals which include electrical fields, magnetic fields, or a combination of electrical fields and magnetic fields (i.e., an electromagnetic wave). The RFID device 10 can be configured to be interrogated by a RFID reader 18, or other such transceiver device, and to respond to such an interrogation with a responsive radio signal. The RFID reader 18 can interrogate the RFID device 10 by sending an electromagnetic wave to the RFID device 10. Such an electromagnetic wave can be received by the conductive element 14, and the conductive element 14 can propagate a responsive signal to be read by the RFID reader 18. Such receiving and propagating of signals can facilitate communication between the RFID device 10 and the RFID reader 18.

In one example, the conductive element 14 can be fabricated by applying a generally uniform layer of conductive material on the substrate 12 and removing portions of the layer of conductive material. As is shown in FIG. 1, removing portions of the conductive material can result in a series of pathways 20 that expose portions of the substrate 12. The remaining conductive material can form the conductive element 14. In one example, the pathways 20 can be formed or etched by the application of a laser to the layer of conductive material to remove conductive material. The application of a laser can result in generally precise and uniform pathways 20 being formed in the layer of conductive material to expose portions of the substrate 12. In other examples, the pathways 20 can be chemically etched, die cutting, or the conductive element 14 can be printed onto the substrate 12 to define pathways 20. In addition, the pathways can be created by punching the conductive material and then filling the punched areas with insulating material to prevent the pathways from short circuiting the device. An exemplary process for using a laser to cut an antenna is shown in corresponding U.S. Provisional Patent Application Nos. 61/354,380, 61/354,388, and 61/354,393 (having a common inventor and assigned to the same assignee as the present application) which is hereby incorporated by reference herein as is necessary for a complete understanding of the present invention.

The pathways 20 can be configured in any of a variety of suitable arrangements to determine the shape of the conductive element 14 that controls the impedance presented to RFID Chip 16. Chip 16 in one example, the pathway 20 can form a generally continuous track that is generally symmetrical about a line X passing through the RFID device 10. In another example, individual pathways 21 can be disconnected from other individual pathways 20. In another example, the pathways 20 can have a relatively large aspect ratio, where the aspect ratio is defined as the length of the pathways 20 compared to the width of the pathways 20. As will be subsequently described in further detail, the configuration of the pathways 20 can be arranged so that the conductive element 14 and the RFID Chip 16 form a RFID device 10 that operates effectively when influenced by conductive and dielectric components positioned relatively close to the RFID device 10.

The RFID chip 16 can be generally positioned along the line X passing through the RFID device 10. In addition, the RFID chip 16 can be placed in electrical communication with the conductive element 14. This connection can be formed directly, by using a process commonly described as flip chip, where the connection points of RFID chip 16 have a metallic bump formed on them which is then pressed into connection with conductive element 14 with the use of a suitable adhesive, or by using an intermediate, such as a package or interposer, where the chip is first attached to the intermediate and the intermediate is attached to a conductive element 14. As previously discussed, the conductive element 14 can be configured to function as an antenna for the RFID device 10 that can receive and propagate signals such as electromagnetic waves. The RFID chip 16 can be configured to process signals received by the conductive element 14. Such processing can include modulating the received signal so that the modulated signal includes information or data stored within the RFID chip 16, which can be transmitted to reader 18 via the antenna formed of conductor 14 and gaps 20. The receiving, processing and propagating of signals by the RFID device 10 can depend upon the operating frequency of the combination of the antenna and the RFID chip 16. Generally, the effective operation of the RFID device 10 can rely in part on the operating frequency of a combination of the antenna impedance and the RFID chip 16 remaining relatively constant or stable. A stable operating frequency can result in either a greater broadcast range for the RFID device 10 or a lower power requirement to broadcast a signal a given distance.

Many environmental parameters can encourage a change in the operating frequency of the combination of antenna and the RFID chip 16. For example, metal components that are positioned in close proximity to the RFID device 10 can affect the operating frequency as a function of the distance between the metal component and the RFID device 10 by altering the impedance of the antenna. For example, the presence of a metal object proximate to the RFID device 10 encourages an increase in operating frequency as the separation between the metal component and the RFID device 10 decreases. This increase in operating frequency can be driven by the decrease in inductance in portions of the antenna impedance as the separation of the RFID device 10 and the metal component decreases. At the same time, the presence of a metal object proximate to the RFID device 10 can encourage a decrease in operating frequency as the separation between the metal component and the RFID device 10 decreases. This decrease in operating frequency can be driven by the increase in capacitance in the antenna impedance as the separation of the RFID device 10 and the metal component decreases. The RFID device 10 can be made substantially insensitive to the spacing between the metallic surface and the RFID device by balancing the decrease in inductance and the increase in capacitance in the antenna impedance. In addition, the RFID device may also be substantially insensitive to the spacing and orientation between it and a reader antenna in proximity.

The operating distance of a RFID device may depend to some extent on the type of material the RFID device is attached. For instance a RFID device adhered to a foil material (e.g. metal foil) may operate with 50 mW of power from a reader at 5 mm separation whereas a RFID device adhered to a plastic material or film may operate with 20 mW of power from a reader at 15 mm separation.

Referring again to FIG. 1, the capacitance and inductance aspects of the antenna impedance of the RFID device 10 can be balanced by the configuration of the conductive element 14 and the isolated pathways 20. Different regions of the conductive pathway 14 contribute more to the capacitance portion of the electrical interaction and others more to the inductive portion. In general, the elements marked as 15 mostly form a capacitance portion of the antenna impedance of RFID device 10 when in proximity to an object, and the pathways 17 mostly form an inductance portion of the antenna impedance of RFID device 10 when in proximity to an object. The size and shape of the conductive element 14 determines the capacitance and inductance of the antenna impedance of RFID device 10. Generally, the greater the area of the conductive element 15, the greater the capacitance component associated with proximity to a conductive surface will be of the antenna impedance. The size and shape of the pathways 20 and hence the size and shape of elements 17 determines the inductance of the RFID device 10. Generally, the greater the length for a given width of the pathways 17, the greater the inductance component of the antenna impedance of the RFID device 10 will be which is inversely related to proximity to a conductive surface. It will be understood that, for a given RFID device footprint, there is generally an inversely proportional relationship between the area of the conductive element 15 and area of the pathways 17. As the area of the pathways 17 increases, the area of the conductive element 15 decreases. Conversely, as the area of the conductive element 15 increases, the area of the pathways 17 decreases. It will be understood that the inductance of the pathways 17 can be increased by lengthening the pathways 17, narrowing the pathways 17, and/or increasing the number of pathways 17.

By placing the RFID chip 16 in connection with conductive element 14 the antenna impedance can be arranged to be substantially stable when in proximity to objects and hence the operating frequency and performance will remain substantially stable. The environment in which the RFID device 10 is intended to be used can be evaluated and analyzed to determine an effective configuration for the conductive element 14 and the pathways 20. The environment can be evaluated for conductive components, such as metals, and dielectric components, such as polymers and paper. The amount and proximity of such conductive and dielectric components can be taken into consideration when designing and arranging the conductive element 14 and pathways 20 of the RFID device 10. Once the environment is evaluated and analyzed, software-driven electromagnetic simulation and modeling can be conducted to approximate the size, shape, and arrangement of the conductive element 14 and pathways 20 that will provide for a generally stable operating frequency for the RFID device 10 for its intended application.

In order to make sure that the RFID device 10 is functioning properly, the RFID device may be tested when it is in a prototype stage, that is after the design has been generated and the pathways created in the conductive substrate, the prototype is tested and based on the results of that testing, the prototype may be further modified, such as with the cutting of additional pathways, removal of more conductive material, or the like. Once the design has been finished or finalized it can be temporarily placed on the consumer product container to make sure it functions in the environment it is to be used in. Again, based on the results of that testing, the design can be further modified and once functionality is proven, the prototype is placed in production.

Figure 2:
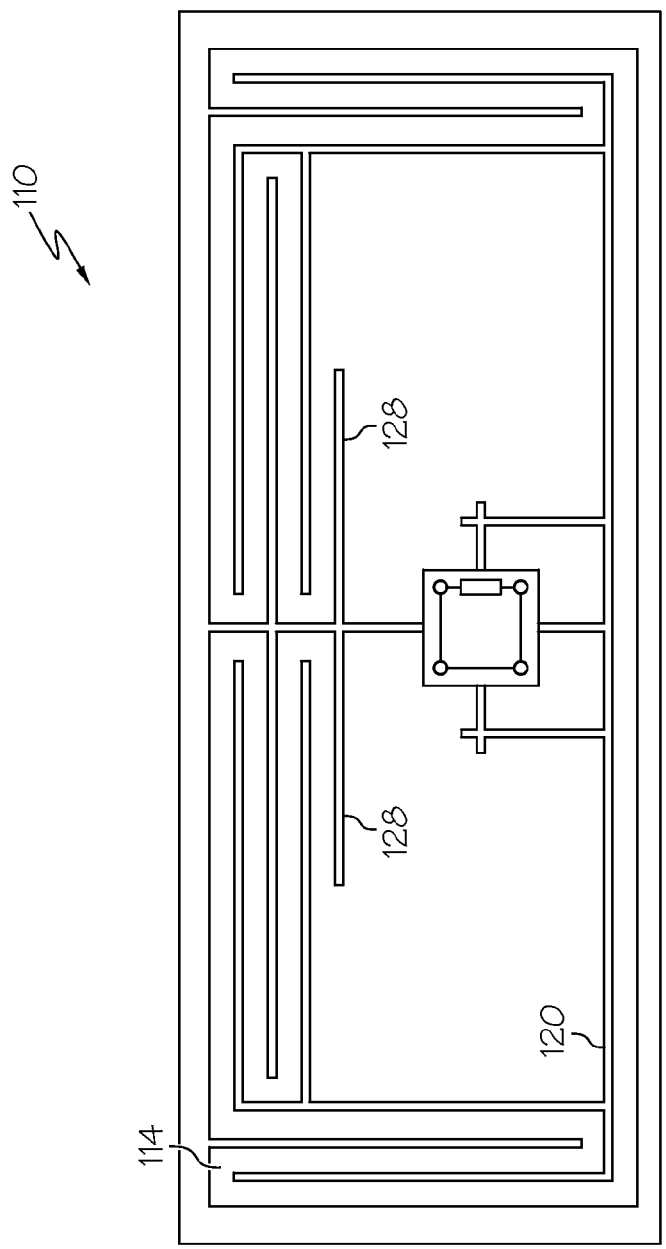
FIG. 2 is a schematic view depicting a RFID device in accordance with an alternative embodiment.
Figure 3:
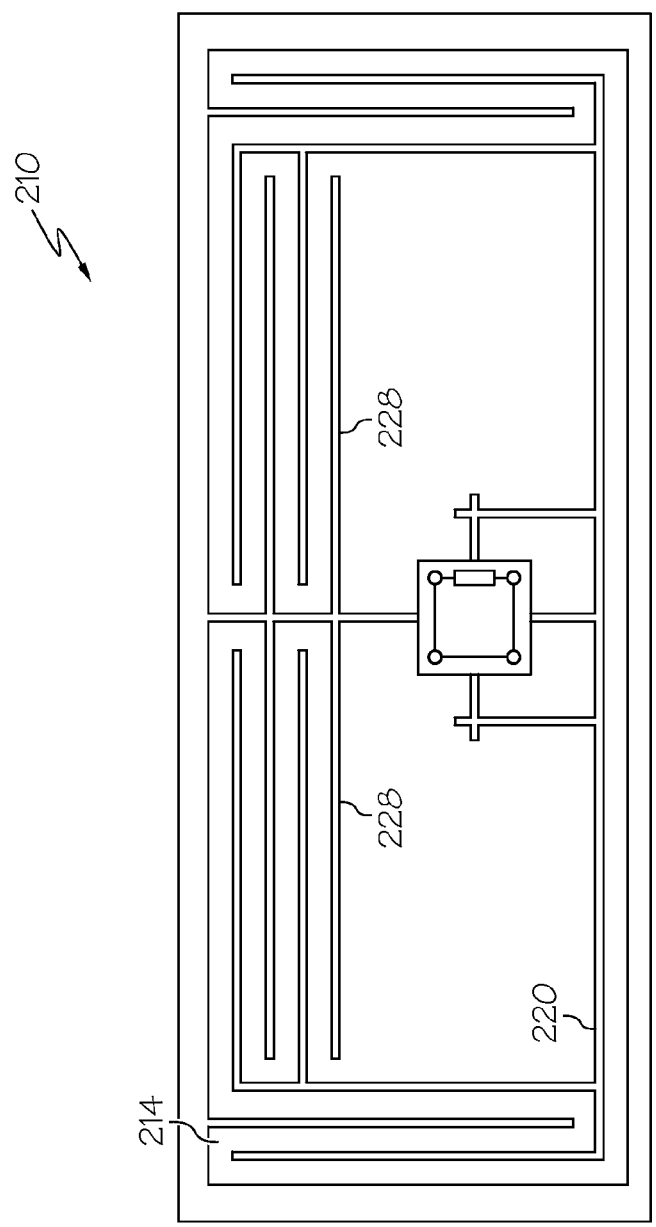
FIG. 3 is a schematic view depicting a RFID device in accordance with another alterative embodiment.
Figure 4:
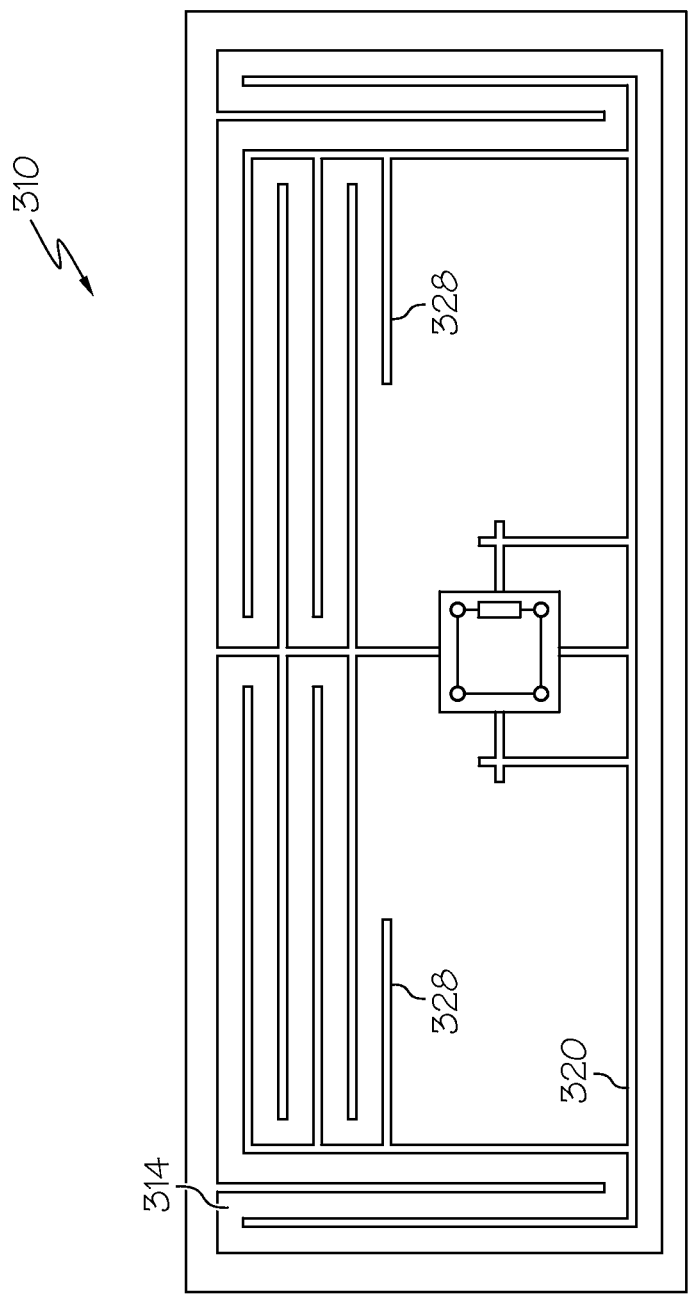
FIG. 4 is a schematic view depicting a RFID device in accordance with another alternative embodiment.

Additional examples of RFID devices are shown in FIGS. 2, 3, and 4. FIG. 2 illustrates a RFID device 110 including a conductive element 114 that defines pathways 120 that include additional legs 128 as compared to the RFID device 10 of FIG. 1. FIG. 3 illustrates a RFID device 210 including a conductive element 214 that defines pathways 220 that include additional legs 228 as compared to the RFID device 110 of FIG. 2. FIG. 4 illustrates a RFID device 310 including a conductive element 314 that defines pathways 320 that include additional legs 328 as compared to the RFID device 210 of FIG. 3. By comparison, the RFID device 310 of FIG. 4 can be effectively used in an environment where a relatively high number of conductive components is present. Whereas, the RFID device 10 of FIG. 1 can be effectively used in an environment where a relatively high number of dielectric components is present. The additional area of the pathways 320 and reduced area of the conductive element 314 in the RFID device 310 of FIG. 4 can limit the increase in capacitance when the RFID device 310 is placed in close proximity to a relatively high number of conductive components. The additional area of the conductive element 14 and reduced area of the pathways 20 in the RFID device 10 of FIG. 1 can limit the increase in inductance when the RFID device 10 is placed in close proximity to a relatively high number of dielectric components.

Figure 5:
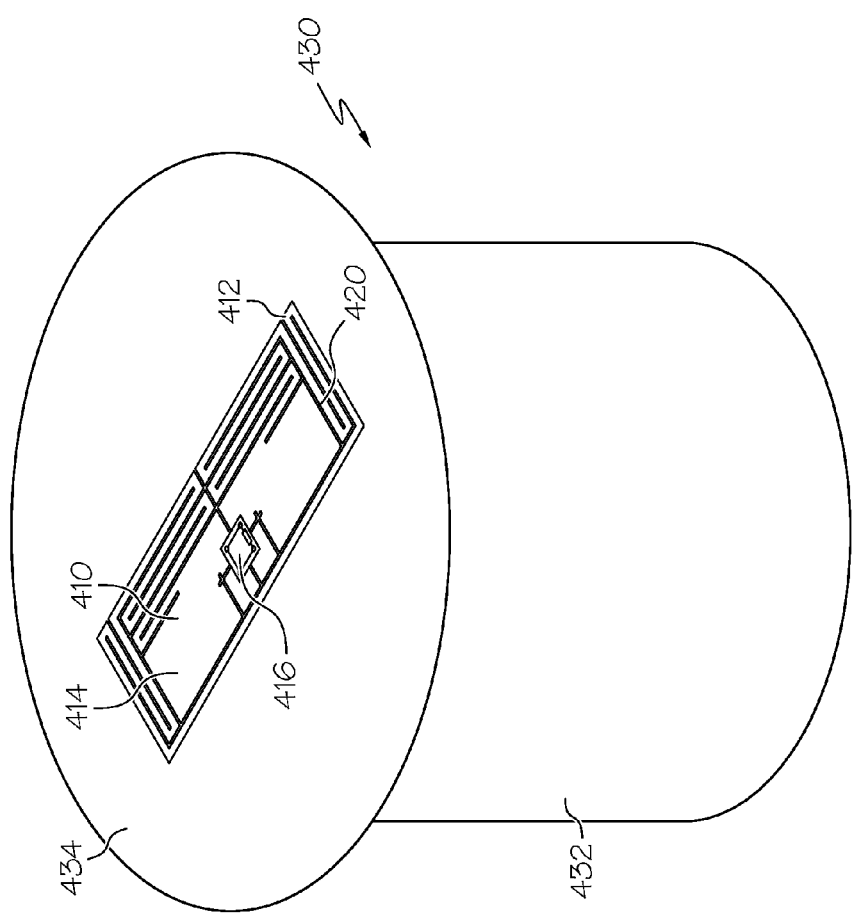
FIG. 5 is a schematic view depicting a RFID device in accordance with another alternative embodiment and affixed to a consumer product.
Figure 6:
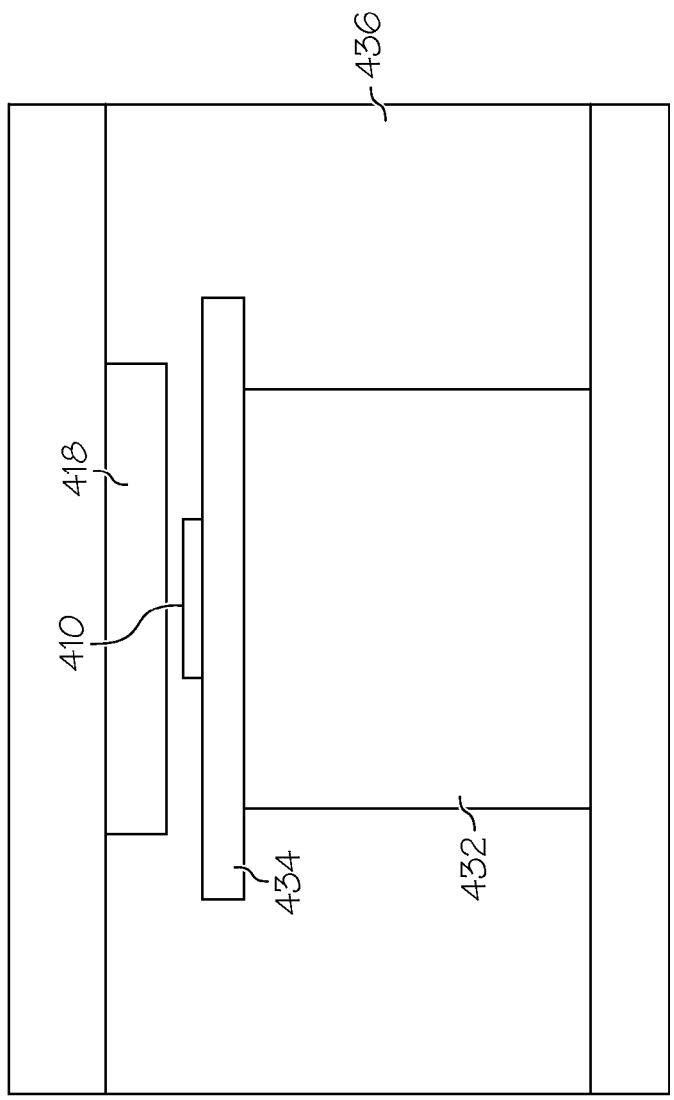
FIG. 6 is a schematic view depicting the arrangement of FIG. 5 positioned within a brewing machine.

An example of an implementation of a RFID device 410 is illustrated in FIGS. 5 and 6. FIG. 5 illustrates the RFID device 410 affixed to a consumer product 430. In one example, a consumer product 430 includes a plastic container 432 that contains coffee grounds, tea leaves or other beverage mixes where the plastic container 432 is sealed with a metal foil lid 434. In one example, the RFID device 410 is affixed to the foil lid 434 with a suitable adhesive. More specifically The RFID device may be placed on a portion of the diameter of a circular foil lid and a RFID chip may be attached to a strap mechanism or an interposer. The strap or interposer may be wrapped around the edge of a container in a planar or non-planar configuration. The RFID device 410 can hold information or data relevant to the consumer product 430. For example, the RFID device 410 can hold information or data such as brewing instructions for the coffee grounds (brewing time, brewing temperature, amount of water to be used, etc.), the name of the manufacturer and/or supplier, the date of packaging, and the duration of its shelf life. In addition, the RFID device 410 can hold recycling information to assist in the handling of the plastic container 432 and metal foil lid 434 after use.

While the RFID device 410 is shown generally centrally disposed of the lid 434 it should be understood that this is intended to only represent an exemplary configuration and that the RFID device 410 may be provided at any other position on the lid 434 or container 432. The placement of the RFID device 410 is dependent upon the environment created by the container and placement may be further dictated by the location of the reader positioned within the device that is used with the consumer product.

As shown in FIG. 6, the consumer product 430 can be placed in a brewing machine 436 to brew the coffee grounds. The brewing machine 436 can include a RFID reader 418 to interrogate the RFID device 410. The RFID reader 418 can broadcast a radio signal to the RFID device 410 to gather stored information and data from the RFID device 410. Upon receiving the radio signal from the RFID reader 418, the RFID device 410 processes the radio signal and encodes a reply signal with information and data stored on the RFID device 410. The RFID reader 418 can interpret the reply signal and provide the brewing machine 436 with the information and data. The brewing machine 436 can then brew the coffee using the brewing time and temperature and the amount of water required.

In the arrangement shown in FIGS. 5 and 6, the environment surrounding the RFID device 410 can be relatively complex. When the RFID device 410 is positioned within the brewing machine 436, the RFID device 410 can be positioned close to a number of conductive and dielectric components. For example, the RFID device 410 can be positioned proximate to the metal foil lid 434. The RFID device can be positioned so that only the substrate 412 of the RFID device 410 separates the conductive element 414 and the RFID chip 416 from the metal foil lid 434. It will be understood that the conductive nature of the metal foil lid 434 can increase the capacitance of the RFID device 410 as the distance between the RFID device 410 and the metal foil lid 434 decreases.

In addition, the RFID reader 418 can be placed in relatively close proximity to the RFID device 410 and can include conductive as well as dielectric components. The brewing machine 436 as well can include a number of conductive and dielectric components placed in relatively close proximity to the RFID device 410. The conductive element 414 and the pathways 420 can be arranged so as to balance the capacitance and the inductance properties of the RFID device 410 as influenced by the conductive and dielectric components of the consumer product 430 and the brewing machine 436. Because the brewing machine 436 and the consumer product 430 can be arranged so that the RFID device 410 can be repeatedly positioned in the same general arrangement relative to the brewing machine 436, once the capacitance and the inductance properties of the RFID device 410 are balanced, the RFID device 410 can effectively operate with a generally stable operating frequency.

Such balancing can be approximated by software-driven electromagnetic simulation and modeling. Once configurations based on simulations and modeling are tested, adjustments can be made in the configuration of the RFID device 410 to further provide a stable operating frequency for the RFID device 410 and, thus, provide for generally effective operation of the RFID device 410. Such a configuration of the RFID device 410 can provide an operating frequency that is generally insensitive to the thickness of the substrate 412 that separates the RFID device 410 from the metal foil lid 434. In another example, in addition to varying the areas of the conductive element 414 and the pathways 420 to facilitate such adjustments, the thickness of the substrate 412 can be varied to increase or decrease the distance of the RFID chip 416 from the metal foil lid 434. Generally, it will be understood that configurations of the RFID device 410 as described and shown herein can facilitate the use of the RFID device 410 in extremely close proximity to a metal surface such as the metal foil lid 434 of the consumer product 430 or the RFID reader 418 of the brewing machine 436.

Figure 8:
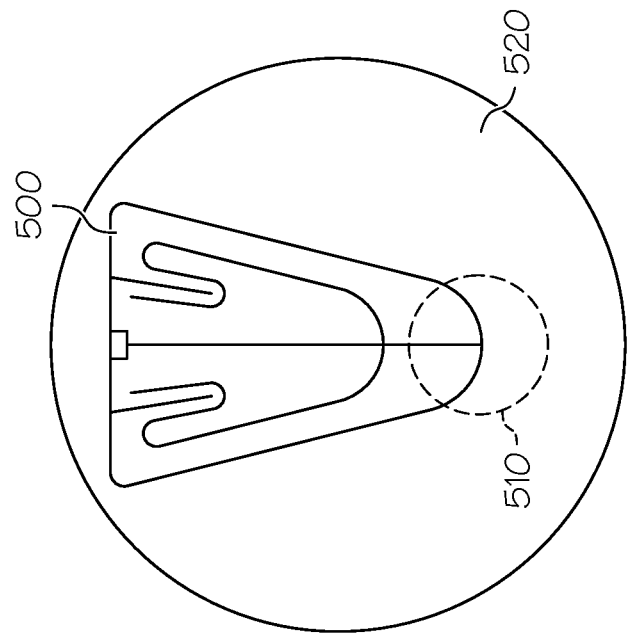
FIG. 8 is a schematic view depicting the alteration of an electrical parameter of a RFID device affixed to a substrate by breaking a portion of the antenna loop of the RFID device.
Figure 7:
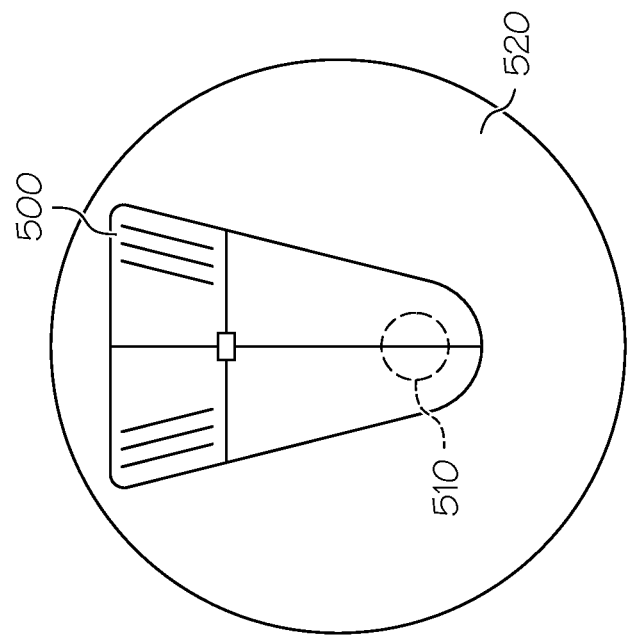
FIG. 7 is a schematic view depicting the alteration of the digital identify of a RFID device affixed to a substrate by cutting an input/output loop.

In a further embodiment the RFID device 500 as shown in FIGS. 7 and 8 may overlap an area associated with physical or electrical changes related to the usage of the product. A physical change may be accomplished by the penetration by a needle assembly. The needle assembly injects a liquid that may change either an electrical parameter of the RFID device, such as its operating frequency as illustrated in FIG. 8, or a digital factor such as a returned identity sensed using an additional loop of conductor attached to the terminals of the RFID chip 16 as illustrated by FIG. 7. In this way the RFID reader can determine if the RFID device has previously been used or not. In FIG. 7 a RFID device 500 is attached to a substrate 520. In one embodiment, the substrate 520 may be a lid of a consumer product in which the lid is constructed out of a foil laminate. A needle injection point 510 on the RFID device 500 allows for penetration by a needle assembly in order to inject a liquid. FIG. 8 illustrates a RFID device 500 having a needle injection point 510 adhered to a substrate 520 in which injection point 510 is able to break a portion of an antenna loop of the RFID device 500.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A RFID (Radio Frequency Identification) device mounted proximate to a metal object, comprising:
    a RFID inlay, the inlay having a substrate, a conductive element, and a RFID chip;
    the conductive element having a plurality of legs and is provided on the substrate and defines at least one pathway;
    the RFID chip includes an integrated circuit, a terminal and an electrical lead connecting the integrated circuit and the terminal;
    the terminal is in electrical communication with the conductive element;
    the RFID device is positioned so that a first portion of the RFID device is positioned about the conductive element and a second portion of the RFID device is positioned above the at least one pathway; and wherein size, shape, and arrangement of both the conductive element and the at least one pathway acts to balance a decrease in inductance and an increase in capacitance of the RFID device when positioned in close proximity to the metal object.

2. A RFID device according to claim 1, wherein the chip is provided on a strap.

3. A RFID device according to claim 1, wherein the substrate includes one of the group consisting of polyethylene terephthalate, polyvinyl chloride, polystyrene, polyethylene, or nylons.

4. A RFID device according to claim 1, wherein the conductive element is fabricated from copper or aluminum.

5. A RFID device of claim 1, wherein the RFID chip is positioned over the at least one pathway.

6. A RFID device of claim 1, wherein the RFID devices holds recycling information.

7. A RFID device as recited in claim 1, wherein the inlay includes a strap that has a portion provided over the at least one pathway and another portion provided over the substrate.

8. A RFID device as recited in claim 7, wherein the strap is provided in one of a planar or a non-planar arrangement with a lid of the container.

9. The RFID device of claim 1, wherein the RFID device is substantially insensitive to a spacing between the RFID device and a metallic surface of the metal object.

* * * * *